US011935357B2

(12) United States Patent
Huke et al.

(10) Patent No.: US 11,935,357 B2
(45) Date of Patent: Mar. 19, 2024

(54) METHOD OF DISPLAYING A ROLLING TICKER ON A SPORTS BETTING USER INTERFACE

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/463,749

(22) Filed: Sep. 1, 2021

(65) Prior Publication Data

US 2022/0122408 A1  Apr. 21, 2022

Related U.S. Application Data

(60) Provisional application No. 63/094,513, filed on Oct. 21, 2020.

(51) Int. Cl.
*G07F 17/32* (2006.01)
*G06F 16/2457* (2019.01)

(52) U.S. Cl.
CPC ........ *G07F 17/323* (2013.01); *G06F 16/2457* (2019.01); *G07F 17/3209* (2013.01); *G07F 17/3213* (2013.01); *G07F 17/3227* (2013.01); *G07F 17/3288* (2013.01)

(58) Field of Classification Search
CPC ............... G07F 17/323; G07F 17/3209; G07F 17/3213; G07F 17/3227; G07F 17/3288; G06F 16/2457
See application file for complete search history.

(56) References Cited

U.S. PATENT DOCUMENTS

| 8,589,971 | B1 * | 11/2013 | Kellum .............. H04N 21/4886 725/50 |
| 2013/0217475 | A1 | 8/2013 | Guan |
| 2019/0147699 | A1 | 5/2019 | Malek |

FOREIGN PATENT DOCUMENTS

WO  2014141099 A1  9/2014

OTHER PUBLICATIONS

International Search Report and Written Opinion dated Jan. 27, 2022 in corresponding International Patent Application No. PCT/US2021/055769; 25 pages.

* cited by examiner

*Primary Examiner* — James S. McClellan
*Assistant Examiner* — Ross A Williams
(74) *Attorney, Agent, or Firm* — Maier & Maier, PLLC

(57) ABSTRACT

A user's wager history and previous interactions with a ticker element on a wagering app can be used to identify the user's wager preferences and tendencies. These preferences can then be used to personalize the order in which ticker elements may be displayed to a user while viewing available wagers. The available wagers can additionally be used with the user preferences to improve the relevance of the ticker elements displayed to both the user and the wagers available to the user to place.

15 Claims, 3 Drawing Sheets

Ticker Prioritization Module

Figure 1:
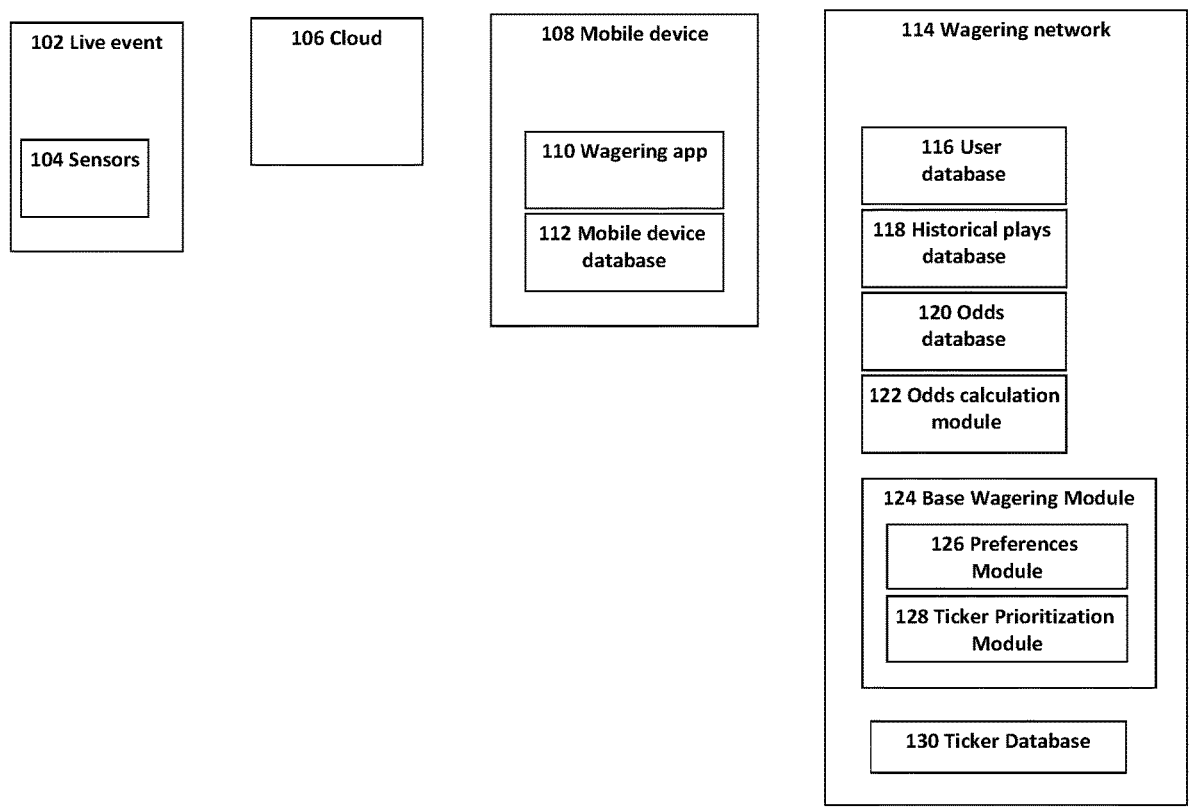

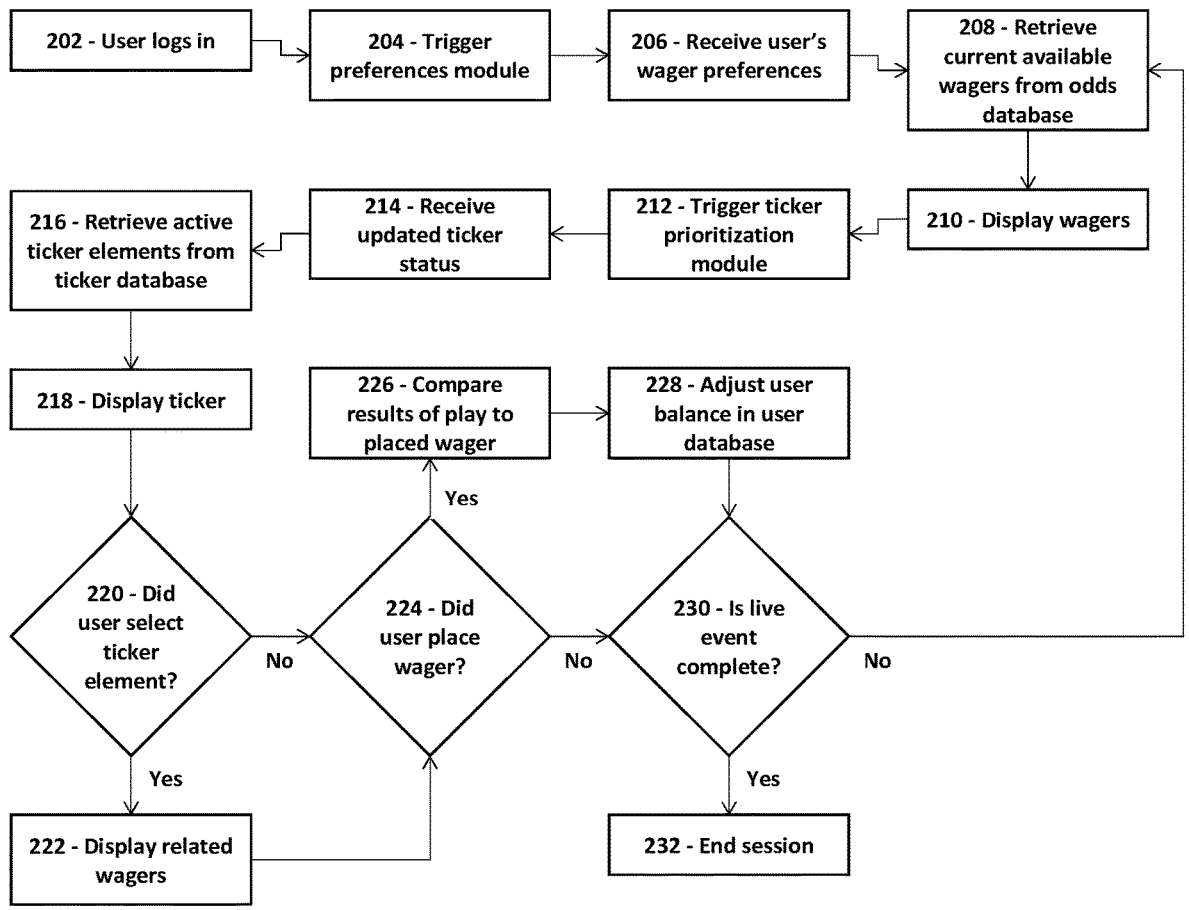
Fig. 2　Base Wagering Module
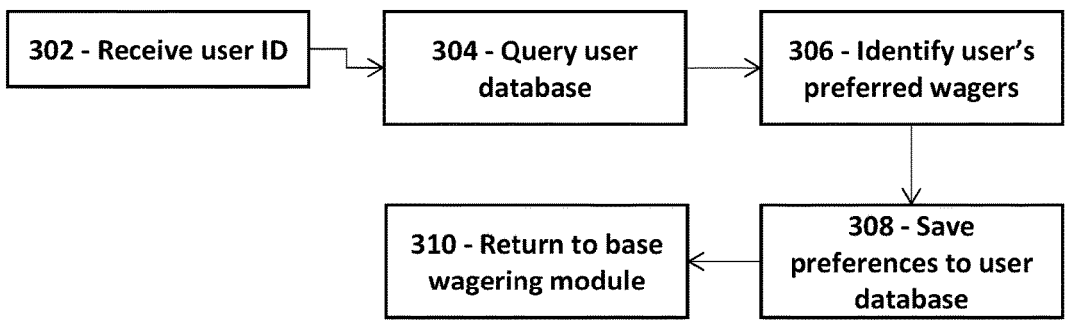
Fig.3　Preferences Module

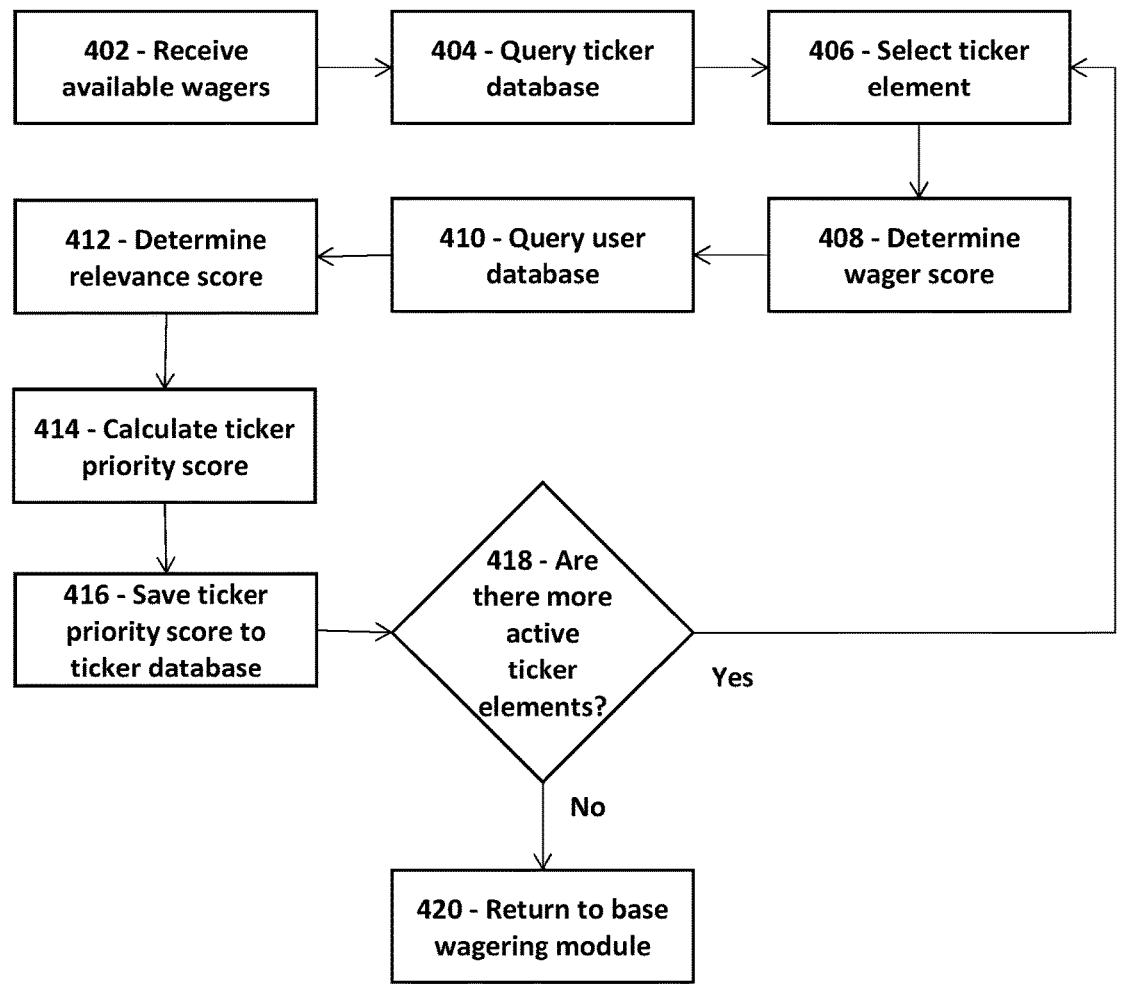

Fig. 4 Ticker Prioritization Module

| Ticker ID | Ticker Text | Sport | Teams | Game Status | Player | Status | Ticker Priority Score |
|---|---|---|---|---|---|---|---|
| 20210809-BB-NYY-BOS | New York Yankees 4 \| Boston Red Sox 2 \| ^6th | Baseball | New York Yankees, Boston Red Sox | 6th Inning | | Active | 4 |
| 20210809-BKB-LAL-BOS | Los Angeles Lakers 56 \| Boston Celtics 68 \| 3rd | Basketball | Los Angeles Lakers, Boston Celtics | 3rd Quarter | | Active | 3 |
| 20210809-HK-BUF-TBL | Buffalo Sabres 3 \| Tampa Bay Lightning 4 \| Final | Hockey | Buffalo Sabres, Tampa Bay Lightning | Complete | | Inactive | 0 |
| 20210809-BB-NYY-JudgeA-21BA | Aaron Judge \| AVG .282 \| OBP .375 | Baseball | New York Yankees | | Aaron Judge | Active | 8 |
| 20210809-BB-NYY-Score | New York Yankees score 2 runs off base hit by Aaron Judge | Baseball | New York Yankees | | Aaron Judge | Inactive | 8 |
| 20210806-AFB-NYG | New York Giants Running Back Mike Webber out with a Hip Injury | America Football | New York Giants | | Mike Webber | Inactive | 0 |

Fig. 5 Ticker Database

METHOD OF DISPLAYING A ROLLING TICKER ON A SPORTS BETTING USER INTERFACE

CROSS-REFERENCE TO RELATED APPLICATIONS

The present patent application claims benefit and priority to U.S. Provisional Patent Application No. 63/094,513 filed on Oct. 21, 2020, which is hereby incorporated by reference into the present disclosure.

FIELD

The disclosures are generally related to in-play or in-play wagering on live sporting events.

BACKGROUND

Ticker feeds are a common fixture on sporting and news television channels to relay information from many live events. Regarding sports, the ticker typically shows scores of live sporting events and those which have concluded. Tickers may also provide news updates that may include a player's injury status, whether a player has signed a new contract with another team or reached a career milestone. These tickers are not typically customized to the viewer.

Play-by-play wagers generally have a short opportunity to place a wager, and pertinent information, such as a game's current score, a player's injury status, or a player's year-to-date statistics, may be critical to the user of a wagering app in deciding whether or not they may place a wager on any given play. Therefore, timely delivery of this information is critical as it may influence a user's decision to place a wager.

Ticker feeds are typically passive features that display a list of information in sequential order. They are not intended to be interacted with, particularly given that they have traditionally been used in television. However, on a wagering app, interaction may be possible and could increase the number or amount of a user's wagers.

By customizing the order of ticker elements in a ticker feed, a user can be provided the most relevant ticker elements to their preferred types of wagers before the less relevant information. This customization may increase the likelihood that the user may place a wager on a given play. Similarly, the ability to view wagers related to a ticker element, especially which also match the user's wager preferences, can allow for the timely presentation of wagering opportunities to the user so that they miss fewer wagering opportunities.

SUMMARY

The embodiments can include methods, systems, and apparatuses for displaying information on a sports wagering interface. In one embodiment, a method for customizing and displaying a rolling ticker feed on a sport wagering network can include retrieving at least one wager preference from a user database; retrieving at least one available wager from an odds database; displaying at least one available wager on a wagering application; retrieving at least one active ticker element from a ticker database; determining at least one wager score for an active ticker element; determining at least one relevance score for an active ticker element; determining at least one ticker priority score using at least one wager score and one relevance score; utilizing at least one ticker priority score to display at least one ticker element on the wagering application; determining input selection of at least one ticker element on the wagering application; receiving at least one input selection from the wagering application; offering at least one available wager on the wagering application; and adjusting at least one account balance to reflect an outcome of an event.

In another embodiment, a system for customizing and displaying a rolling ticker feed on a sport wagering network can include a base wagering module; a preferences module; a ticker prioritization module; and a ticker database; where the base wagering module is configured to initiate the preference module, receive at least one wager preference and at least one available wager, display at least one wager, initiate the ticker prioritization module, retrieve at least one active ticker element from the ticker database, display at least one active ticker element, determine selection of the active ticker element, display at least one related wager to the active ticker element, determine placement of a wager, and update at least one account balance based on an outcome of an event; the preferences module is configured to receive at least a user ID, query a user database, identify at least one wager preference, save the wager preference to the user database, and send the wager preference to the base wagering module; the ticker prioritization module is configured to receive at least one available wager, query the ticker database, select at least one ticker element, determine at least one wager score, one relevance score, and one ticker priority score, save the ticker priority score to the ticker database, determine if there is at least one additional active ticker element, and send at least one updated ticker element to the base wagering module; and the ticker database is configured to contain at least one ticker element and one ticker priority score.

BRIEF DESCRIPTIONS OF THE DRAWINGS

The accompanying drawings illustrate various embodiments of systems, methods, and various other aspects of the embodiments. Any person with ordinary art skills may appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for a customized rolling ticker feed, according to an embodiment.

FIG. 2: illustrates a base wagering module, according to an embodiment.

FIG. 3: illustrates a preferences module, according to an embodiment.

FIG. 4: illustrates a ticker prioritization module, according to an embodiment.

FIG. 5: illustrates a ticker database, according to an embodiment.

DETAILED DESCRIPTION

Aspects of the present invention are disclosed in the following description and related figures directed to specific embodiments of the invention. Those of ordinary skill in the art may recognize that alternate embodiments may be devised without departing from the spirit or the scope of the claims. Additionally, well-known elements of exemplary embodiments of the invention may not be described in detail or may be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that may be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game may end with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" may be the combined number of runs, points or goals scored by both teams during the game, including overtime. The "over" refers to a sports bet in which the player wagers that the combined point total of two teams may be more than a specified total. The "under" refers to bets that the total points scored by two teams may be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player may receive a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team may score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet may be the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) may be selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, may now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described. may end FIG. 1 is a system for a customized rolling ticker feed. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which may be the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks may allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they may move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks may often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the Internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and may be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that may contain the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers may comprise Further, embodiments may include a base wagering module 124, which may allow users to log in and determine their wager preferences using a preferences module 126. The base wagering module 124 may further use the user's wager preferences and the available wagers from the odds database 120 to prioritize ticker elements to be displayed to a user via a ticker feed on a wagering app 110. The ticker feed may be displayed to the user with at least one available wager to place on a play during a live event 102. In addition, the user may interact with the ticker element to view more available wagers related to the ticker element.

Further, embodiments may include a preferences module 126 that may query a user database 116 and may receive additional information from a user to determine the user's wager preferences, comprising the types of wagers and odds for which the user is likely to place a wager. Preferences may be based upon the user's past wagers and may additionally use past interactions made with ticker elements. Each of the wagers and the ticker elements may have at least one characteristic such as a type of live event 102, participants in the live event 102 such as an athletic team or player, and further may include contextual information such as the type of play wagered upon, the period of gameplay, time of day, geographic location, etc. of the live event 102, wager or ticker element.

Further, embodiments may include a ticker prioritization module 128, which may receive currently available wagers from the base wagering module 124 and may query the ticker database 130 to retrieve active ticker elements. Active ticker elements may be comprised of news events, statistics, or live event 102 status updates provided to a user via a ticker feed. Ticker elements may be inactive if they are no longer relevant as determined by the administrator of a wagering network or a third party. A ticker element may also be determined to be inactive if a user dismisses a ticker element. A ticker element may be selected, and the characteristics of the ticker element may be compared with the characteristics of the wagers received from the base wagering module 124 to determine a wager score. The user database 116 may be queried to receive the user's wager preferences which may then be compared to the characteristics of the ticker element to determine a relevance score. The wager score and the relevance score may then be used to calculate a ticker priority score indicating the relevance of the ticker element to the user in the context of the currently available wagers. The ticker priority score may then be saved to the ticker database, and the process may be repeated for all remaining active ticker elements.

Further, embodiments may include a ticker database 130 for storing ticker elements comprised of any game scores, team or player statistics, news events, etc. Game scores may include final game scores, the current score, and the game's status, which may include the period of the game, inning, time remaining, etc. Similarly, a ticker element may be a notification that a team or player has scored or achieved another notable action during the live event 102, such as an American football player achieving a total rushing yards run record or breaking the record for the longest field goal. Team or player statistics may include all-time statistics, career statistics, current season statistics, or current game or series statistics. Examples of team statistics including a team's win-loss record against their current opponent, a team's current ranking in the current season's standings, a team's average runs scored in a game, etc. Examples of player statistics may include a pitcher's win record, earned run average, number of saves, batter's batting average, on-base percentage, number of runs batted in, number of home runs, etc. In basketball, statistics include a player's field goal percentage, career points, the average number of assists per game. In football, statistics may include passing yards, rushing yards, points scored, etc. A ticker element may also comprise news events such as a player injury, the announcement of a player's trade from their current team to a new team, or a delay in gameplay due to rain. A ticker element may additionally include details about a wager, such as a new wager available to be placed, or changes to a wager such as improved odds or the results of a wager placed by the user. The ticker database 130 may additionally store a ticker priority score calculated by the ticker prioritization module 128, which may indicate the relevance of a ticker element to a user's preferences based on their wager history and the currently available wagers. The ticker database 130 may be populated by the administrator of a wagering network 114 and may additionally be updated by a third party, such as via a sports news or statistics database or service. The ticker database 130 may further be updated by the ticker prioritization module 128 and may be used by the base wagering module 124 and the ticker prioritization module 128.

FIG. 2 illustrates the base wagering module 124. The process may begin with the user logging in, at step 202, to the wagering app 110. The user may log in with a username and a password. The username may comprise an email address or a string of alphanumeric characters or symbols chosen by the user or generated randomly. Similarly, the password may comprise alphanumeric characters or symbols chosen by the user or generated randomly. Alternatively, the user may log in using a password manager, which may store the username and password, allowing for a universal password or pin number, or biometrics including fingerprint, facial recognition, or iris scanning to authenticate the user and log into the wagering app 110. The base wagering module 124 may trigger, at step 204, the preferences module 126 by providing the user's identifying information, such as a user ID or account number, to the preferences module 126, which may retrieve the user's historical wagering data from the user database 116 and may receive additional data provided by the user to identify the user's wager preferences. Additionally, retrieving the user's ticker element interactions may be used to determine the user's wagering preferences. In an embodiment, the user ID for a user, John Smith, is 3596344. The base wagering module 124 may receive, at step 206, the user's wager preferences from the preferences module 128. The wager preferences for the user John Smith comprising baseball games, especially those where the New York Yankees are competing and wagers involving batters, such as whether a batter may strike out or get a base hit or hit a home run, earn an RBI, etc. The base wagering module 124 may tetrieve, at step 208, the currently available wagers on the live event 102 from the odds database 120. The odds may be calculated by the odds calculation module 122 and comprising a win condition and odds, which may be represented as a payout ratio, such as 5:1 where a person wagering $10 would receive $50 for a successful outcome. In an embodiment, an exemplary wager during a baseball game between the New York Yankees and the Boston Red Sox is that the next batter may get a base hit at odds of 3:1. The wager may additionally include a default wager amount such as $50. The currently available wagers may comprise all currently available wagers or a selection of all currently available wagers. The wagers may be selected randomly or according to the user's preferences as determined by the preferences module 126 and stored in the user database 116. The wagers may similarly be based upon the user's wagering history, including trends in the user's recent wagers, such as the wagers placed during the current session or live event 102. In an embodiment, a selected wager is that the next batter during a baseball game between the New York Yankees and the Boston Red Sox may get a base hit at odds of 3:1. Additionally, a selected wager may include that the New York Yankees may score at least two runs in the current inning. Selected wagers may additionally be related to different live events 102, such as basketball games, American football games, hockey games, etc. The base wagering module 124 may display, at step 210, the available wagers to the user via a wagering app 110. The user may be presented a single wager or multiple wagers, which may be presented individually, or multiple wagers may be displayed on the screen simultaneously. The user may scroll or page through the wagers. In an embodiment, the wagers may be displayed in a list on a wagering app 110 on a mobile device. The base wagering module 124 may trigger, at step 212, the ticker prioritization module 128 and send the currently available wagers as retrieved from the odds database 120. Additionally, the base wagering module 124 may send the wager visibility status, indicating whether being viewed by the user. A wager may be visible if it is actively displayed on the mobile device 108 or in a list of wagers displayed to the user. The ticker prioritization module 128 may additionally query the ticker database 130 for active ticker elements and the user database 116 for the user's wager preferences, including the user's previous interactions with ticker elements. An active ticker element may be selected, and scores are calculated for relevance to the user's preferences and the available wagers. The scores may then be used to calculate a ticker priority score which may be saved to the ticker database 130, and the process may be repeated for all active ticker elements. An available wager that the next batter during a baseball game between the New York Yankees and the Boston Red Sox may get a base hit at odds of 3:1. An additional wager may be available on the New York Yankees, scoring at least two runs in the current inning at odds of 12:1. The base wagering module 124 may receive an updated ticker status, at step 214, from the ticker prioritization module 128. The ticker status may indicate that the active ticker elements have been updated with a ticker priority score, indicating the relevance of each ticker element to the user based on the user's preferences and wager history. The ticker priority score additionally may reflect relevance to the wagers available to be placed by the user. Active ticker elements may be retrieved by the base wagering module 124, at step 216, from the ticker database 130. The active ticker elements may comprise statistics or news related to at least one live event 102 and include a ticker priority score calculated by the ticker prioritization module 128. Examples of ticker elements may include the score of a sporting event, including a baseball game, basketball game, American football game, hockey game, etc. Ticker elements may further relate to performance statistics, injury status, etc., of participants in the live event 102, such as an athletic team or players. In an embodiment, a ticker element comprising the 2021 season batting average for New York Yankees player, Aaron Judge, which may be 0.282 and his on-base percentage is 0.375, which may have a ticker priority score of 11. Another ticker element comprising the score of a baseball game between the New York Yankees and the Boston Red Sox with the Boston Red Sox leading with a score of 5 to 3 in the bottom of the 6th inning with a ticker priority score of 9. The base wagering module 124 may display, at step 218, the ticker elements in a ticker feed on a wagering app 110 such that the ticker is visible to the user while the user is viewing the one or more available wagers. The ticker elements may be displayed such that the ticker element with the highest ticker priority score may be displayed first, and additional ticker elements may be displayed in the descending score order, with the last ticker element displayed having the lowest priority score. All the active ticker elements may be displayed, or a maximum number of ticker elements may be predetermined, such as no more than ten ticker elements. Alternatively, only ticker elements above a threshold priority score may be displayed, such as ticker elements with a score above 5. In some embodiments, both a priority score threshold and a maximum number of ticker elements may be defined to limit the number of ticker elements displayed. When all active ticker elements may be displayed to the user, the ticker elements may repeat, such that after the last ticker element is displayed, the first ticker element may be displayed again. The ticker elements may additionally be selectable by the user, such as by double-tapping the screen of the mobile device 108 on the ticker element or via a long press. In an embodiment, first displaying a ticker element comprising the 2021 season batting average for New York Yankees player, Aaron Judge, may be 0.282. His on-base percentage may be 0.375, which may have a ticker priority score of 11 and then display the ticker element comprising the score of a baseball game between the New York Yankees and the Boston Red Sox, with the Boston Red Sox leading with a score of 5 to 3 in the bottom of the 6th inning with a ticker priority score of 9. The base wagering module 124 may determine, at step 220, whether the user selected the displayed ticker element. The user may select the ticker element by double-tapping the screen of the mobile device 108 on the ticker element or via a long press. Alternatively, the user may use tactile inputs or provide a voice prompt to the mobile device 108 instructing the wagering app 110 to display currently available wagers related to the ticker element. In an embodiment, the currently displayed ticker element may be the 2021 batting average and on-base percentage for New York Yankees player, Aaron Judge and the user, John Smith, selects the ticker element by double-tapping the ticker element on the mobile device 108. Wagers related to the selected ticker element may be displayed at step 222. The wagers may include at least one wager characteristic common to the selected ticker element. The displayed wagers may additionally be selected based upon the user's preferences as stored in the user database 116 and determined by the preferences module 126. In response to selecting the ticker element showing the 2021 batting average and on-base percentage for New York Yankees player, Aaron Judge, displaying related wagers including a wager that Aaron Judge may get a base hit on his next at-bat with odds of 3:1 as both the wager and the ticker element share the characteristics of the New York Yankees and the player, Aaron Judge. An additional wager may include a wager that the New York Yankees may win their in-progress game with the Boston Red Sox with odds of 2:1 because both the wager and the ticker element share the characteristic of New York Yankees. A wager from the user may be received at step 224. The wager comprising a wager amount that the win condition may occur at the specified odds such that the odds represent the multiple to be applied to the wager amount to determine the payout provided the user wins the wager. In an embodiment, the user John Smith may place a wager for $50 that the next batter may get a base hit at odds of 3:1. Alternatively, the user may not place a wager by either selecting an option to pass on placing a wager or allowing the opportunity period during which the user can place a wager to elapse. In an embodiment, the user John Smith may allow the opportunity period to elapse without placing a wager. The base wagering module 124 may compare the play results during the live event 102, at step 226, to the win condition of the selected wager to determine whether the user won the wager. In an embodiment, the next batter struck out and did not get a base hit; therefore, the user John Smith did not win the wager. In an alternate embodiment, the next batter hit a double and therefore got a base hit, in which case the user John Smith won the wager. The user's account balance may be adjusted by the base wagering module 124, at step 228, according to the wager results. If the user lost the wager, the wager amount may be deducted from the user's account. Alternatively, if the user won the wager, the payout amount may be determined by multiplying the wager amount by the odds. The payout amount may then be added to the user's account balance. In an embodiment, the user John Smith lost the wager, and therefore the wager amount of $50 may be deducted from his initial account balance of $1200, resulting in a new account balance of $1150. In an alternate embodiment, the user John Smith won the wager, and a payout of $150, determined by multiplying the wager amount of $50 by the odds of 3:1, may be added to the initial account balance of $1200, resulting in a new account balance of $1350. The base wagering module 124 may determine, at step 230, whether the live event 102 is complete. The live event 102 may be complete if it has concluded, such as the end of elapsed playtime during a sporting event. In an embodiment, a baseball game may be concluded after the third out of the top of the 9th inning if the home team is leading, after the third out of the top of the 9th inning if the away team is leading, or if the home team scores a winning run in the bottom of the 9th inning. A baseball game may additionally conclude in an inning beyond the 9th inning if the 9th inning concludes in a tie. If the live event 102 is not complete, the base wagering module 124 may return to step 208 and retrieving currently available wagers from the odds database 120. The base wagering module 124 may end, at step 232, the session if the live event 102 is complete.

FIG. 3 illustrates the preferences module 126. The process may begin with receiving, at step 302, a user ID from the base wagering module 124. The user ID may be associated with a user and their user account. In an embodiment, the user ID is 3596344 and is associated with a user, John Smith. The preferences module 126 may query, at step 304, the user database 116 for details associated with the user such as the user's previous wagers and wager preferences such as the types of live events 102, athletic teams, players, types of wagers, or odds on which the user prefers to place wagers. The wager information may additionally include geolocation data, such as locations where the user has previously placed wagers or the location of live events 102 and the proximity of the live event 102 wagered upon to the user. The user database 116 may additionally store contextual information about the user's wagers, such as wagers that were also placed by the users' friends and wagers placed as part of a parlay or as a hedge against another wager. The contextual information may also include whether a wager resulted from a challenge by a friend or a wagering app 110.

The user database 116 additionally including the wager amount and results of the wagers. In an embodiment, a previous wager placed by the user John Smith may include a wager of $100, that Aaron Judge would hit a home run in an at-bat at odds of 10:1. The wager may further include the results that Aaron Judge hit a home run in the designated at-bat, resulting in a $1000 payout. Additional information may include a history of the user's interactions with ticker elements, such as a score update for a baseball game between the New York Yankees and the Boston Red Sox. The preferences module 126 may identify, at step 306, the user's preferred wagers based on the user's wager history retrieved from the user database 116. The preferred wagers may include a type of wager that may be distinguished by characteristics, including any type of live event 102, athletic team, player, type of wager, or odds involved in the wager. The user may additionally wager upon them at a significantly higher rate than other wagers, such as more than double the average wager. Alternatively, the preferred wagers may be determined by ranking the types of wagers by the total number of wagers placed by the user and selecting a predetermined number of the results, such as the top 5 wagers. In an embodiment, the user John Smith may be determined to prefer to place wagers on batters, such as whether they may get a base hit, strikeout, earn an RBI, etc., during an at-bat. The user's preferred wagers may additionally include contextual bets, such as parlaying or hedging a second bet with a first bet or placing a wager in response to a friend placing a wager or receiving a challenge from a friend to place a particular wager. Such contextual wagers may be determined to be a preferred type of wager if they represent a significant portion of the user's overall wagering activity or if the user meets or exceeds a predetermined threshold value representing the percentage of wagers placed to the number of total opportunities within a particular context. For example, if the user John Smith places a wager 60% of the time in response to the user John Smith's friend, Jane Doe, placing the same wager before John Smith, it may be determined that placing a wager in response to a friend's wager, especially his friend, Jane Doe, is a preferred wager type for user John Smith as it exceeds a predetermined threshold value of 50%. Additionally, the user may manually provide preferences via a wagering app 110. The user's preferred wagers may also consider the user's interactions with ticker elements such that wagers with characteristics matching the ticker elements with which the user frequently interacts are more preferred than characteristics common to ticker elements and wagers user infrequently or does not interact with. The preferences module 126 may save, at step 308, the user's wager preferences to the user database 116. The user's wager preferences may comprise the types of wagers and wager characteristics the user most frequently chooses to place wagers upon or and the types of wagers the user has chosen as their preferred types of wagers via manually defined preference settings. In an embodiment, updating the user database 116 with the user John Smith's preferred wagers on the outcome of a baseball player at bat, such as whether the player may get a base hit, strikeout, earn an RBI, etc. Additionally, the preferences module 126 may save the user John Smith's interactions with ticker elements relating to baseball games in which the New York Yankees are competing. The preferences module 126 may return, at step 310, to the base wagering module 124 with the user's wager preferences. In an embodiment, the wager preferences for a user John Smith including baseball games, particularly those in which the New York Yankees are competing, and additionally plays involving the outcome of a baseball player's at-bat, such as whether the player may get a base hit, strikeout, earn an RBI, etc.

FIG. 4 illustrates the ticker prioritization module 128. The process may begin with the ticker prioritization module 128 receiving, at step 402, the currently available wagers from the base wagering module 124. In an embodiment, a selected wager may be that the next batter during a baseball game between the New York Yankees and the Boston Red Sox may get a base hit at odds of 3:1. The ticker database 130 may be queried, at step 404, by the ticker prioritization module 128 for active ticker elements. Active ticker elements may include information such as news and statistics related to the live event 102 or the participants of the live event 102, which may be displayed to a user via a ticker feed. A ticker feed may typically presented to a user in the form of a band that scrolls across the top or bottom of a display and presents ticker elements to the user in sequential order. Examples of ticker elements may include the score of a baseball game between the New York Yankees and the Boston Red Sox or a basketball game between the Los Angeles Lakers and the Boston Celtics. A game's score may additionally include an indication of the status of the game, such as the inning, and whether it may be the top or bottom of the inning in the case of a basketball game, or the period of the game, which may be the case for events including basketball, American football, and hockey games. For live events 102, where individual athletes compete against each other such as golf, a ticker element may comprise a list of the top five competitors and their current scores. If the live event 102 has concluded, a score for that event may include an indication that the game is over, including the word "Final" next to the score or by changing the color of the ticker element when it may be displayed or by highlighting the winner. Ticker elements may alternatively comprise statistics, such as a team's all-time or current season win percentage, or a player's statistics, such as batting average and on-base percentage for a baseball player or total yards run for a football player. The statistics may be for the current live event 102, the current season, or a player's career. Similarly, the statistics may include comparing a team or player's current performance in the live event 102 versus their historical performance. The ticker elements may alternatively include news events which may be comprised of an announcement that a player is being traded from one team to another, that a player has been injured, or that a team during an American football team just scored a touchdown. A ticker element may be active if the information is current and is intended for display to a viewer. The ticker element may be created and updated by a third party and saved to the ticker database 130, determining whether a ticker element is active or inactive. In an embodiment, an active ticker element may be comprised of the 2021 season batting average for New York Yankees player Aaron Judge, which is 0.282, and his on-base percentage is 0.375. A ticker element may be updated to be inactive if the information in the ticker element is no longer accurate or if the administrator of a wagering network 114 or a third-party database which may be used to update the ticker database 130 determines the ticker element is no longer relevant or if it was given an expiration time. For example, a ticker element announcing that the New York Yankees scored a run may be given an expiration time of 2 minutes after the run was scored. The ticker prioritization module 128 may select, at step 406, a ticker element from the active ticker elements retrieved from the ticker database 130. In an embodiment, a ticker element comprising the 2021 season batting average for New York Yankees player, Aaron Judge, is 0.282 and his on-base percentage is 0.375. The ticker prioritization module 128 may determine, at step 408, a wager score for the selected ticker element by comparing the ticker element to the available wagers. Each available wager being comprised of characteristics that may be used to describe the wager, such as the type of live event 102, the parties involved, which may include a team and one or more players, and the type of wager such as whether the wager relates to a batter or a pitcher during a baseball game, or whether it relates to a field goal attempt during an American football game. Ticker elements may similarly be comprised of characteristics that can be used to describe them. For example, a ticker element may be comprised of the score of a baseball game between the New York Yankees and the Boston Red Sox, in which case the characteristics may include the type of live event 102, a baseball game, and the athletic teams, the New York Yankees and the Boston Red Sox. The ticker element may also comprise contextual elements such as the score, which may correlate to a wager characteristic of the topic or type of wager, including wagering upon the result of the live event 102. The wager score may be determined by comparing wager characteristics and the ticker element characteristics and assigning a score when the characteristics match. The score may be determined by totaling the number of matching wager characteristics and ticker element characteristics. The score may be tallied by considering each unique matching characteristic or all matching characteristics. For example, if the ticker element may be the 2021 season batting average and on-base percentage for New York Yankees player Aaron Judge, then the ticker element characteristics may be the type of live event 102, baseball, the team, the New York Yankees, the player, Aaron Judge, and the activity of batting. If matching characteristics for all wagers, then if there are five wagers relating to the New York Yankees, this ticker element may be assigned five points for the five matching wager characteristics. Two additional points may be assigned to increase the total to seven if two of those wagers also relate to Aaron Judge. Alternatively, a point may only be assigned for each unique wager, in which case the score may remain five as Aaron Judge is a player on the New York Yankees. In further embodiments, all characteristics may be considered, but they may be weighted. For example, the team characteristic may be weighted at 0.5 points, whereas the player is weighted at 1. For the previous example, the ticker element would have a score of 4.5, with 2.5 points coming from the five wagers involving the New York Yankees and 2 points from the wagers involving Aaron Judge. The ticker element may also be determined by tallying a score for each wager relative to the ticker element individually and then finding an average score for all available wagers to be used as the wager score. Further embodiments may modify the wager score based on whether the user is currently viewing a wager relating to the user's ticker element. The user database 116 may be queried, at step 410, by he ticker prioritization module 128 for the user's wagering preferences. The wagering preferences may comprise the types of live events 102, the participants of the live events 102, and the types of plays or actions during the live events 102 that the user typically wagers upon. In an embodiment, the user John Smith may prefer to place wagers on baseball games, particularly those involving the New York Yankees. The user John Smith additionally preferring to place wagers on plays involving an action or result achieved by a batter. The ticker prioritization module 128 may determine, at step 412, a relevance score for the selected ticker element representing how closely the ticker element aligns with the user's preferences by comparing the ticker element to the user preferences identified by the preferences module 126. The relevance score may be determined similarly to determining the wager score in step 408. The ticker element may be comprised of characteristics that describe the ticker element, including the type of live event 102, participants of the live event 102 including teams and individual players, and additional contextual information such as the score of the live event 102, statistics relating to a play type such as pitching or batting in a baseball game or yards run in an American football game. These ticker element characteristics may be matched to user preferences, and a score is determined by tallying all preferences matching the ticker element. For example, ticker element may be the 2021 season batting average and on-base percentage for New York Yankees player Aaron Judge; then the ticker element characteristics may be the type of live event 102, baseball, the team, the New York Yankees, the player, Aaron Judge, and the activity of batting. As the wager preferences for the user, John Smith, include baseball games and the New York Yankees, this ticker element's score may be two. If the user preferences also included the player, Aaron Judge, then the relevance score would increase to three. Alternatively, the score may increase if the user's preferences included wagers placed on batters during a baseball game. Similar to the wager score, the relevance score may include weighted scores for each user preference or ticker element characteristic. The ticker priority score for the selected ticker element may be calculated, at step 414, by the ticker prioritization module 128 using both the wager and relevance scores. The ticker priority score may be calculated by summing the wager score and the relevance score. Alternatively, the ticker priority score may be calculated by multiplying the wager score and the relevance score. Further embodiments may find the ticker priority score by weighting one or both the wager and relevance scores before summing or otherwise combining the wager and relevance scores. In an example, the relevance score may be multiplied by the total number of available wagers before summing the wager score and the weighted relevance score to even the strength of a wager score to account for an increased score ceiling for the wager score resulting from many available wagers contrasted with the relevance score which is limited to the number of user preferences matching the ticker element characteristics. The ticker priority score may also be calculated using the component scores, such as for each wager characteristic or user preference matching the ticker element the wager score and the relevance score and artificial intelligence, which may be trained by a third party or an administrator of a wagering network 114 to assign a ticker priority score which maximizes the relevance of ticker elements for a user. The ticker priority score may be stored, at step 416, by the ticker prioritization module 128 to the ticker database 130. The ticker priority score may be associated with its corresponding ticker element and represents the relative priority for displaying the ticker element to the user. A ticker element with a higher ticker priority score should be displayed to a user before a ticker element with a lower ticker priority score. The ticker prioritization module 128 may determine, at step 418, whether there are more active ticker elements that have not been assigned a ticker priority score. If there are more active ticker elements, the ticker prioritization module 128 may return to step 406 and selecting another ticker element. In an embodiment, there is another ticker element without a ticker priority score comprising the score of a basketball game between the Los Angeles Lakers and the Boston Celtics, with the Lakers leading the Celtics 64 to 58 in the third quarter. In an alternate embodiment, all active ticker elements have been assigned a ticker priority score. The ticker prioritization module 128 may return, at step 420, to the base wagering module 124 with the status that all active ticker elements have been updated with a ticker priority score.

FIG. 5 illustrates the ticker database 130. The ticker database 130 may contain ticker elements which may comprise any of game scores, team or player statistics, new events, etc. which may be displayed to the user of a wagering app 110. Game scores may include the current score of the game and the game status, such as whether the game is completed, and if not, the period in which the game is. For example, a ticker element may be comprised of the score of a baseball game between the New York Yankees with 4 runs and the Boston Red Sox with 2 runs in the top of the sixth inning. Another example may be the score final score of a hockey game between the Buffalo Sabers with a score of three and the Tampa Bay Lightning with a score of 4. A ticker element may comprise a notification that a team or a specific player has scored or achieved another notable action during a live event 102 such as an American football quarterback breaking an all-time passing yards record or a kicker breaking the record for the longest field goal. Similarly, a ticker element may provide a notification of a score change, such as New York Yankees player scoring 2 runs off a base hit by Aaron Judge. Ticker elements may further be comprised of a team or player statistics which may be all-time statistics, career statistics, current season statistics or current game or series statistics. Examples of team statistics may include a team's win-loss record against their current opponent, a team's current ranking in the current season's standings, a team's average runs scored in a game, etc. Examples of player statistics for a baseball player may include a pitcher's win record, earned run average, number of saves, or a batter's batting average. For a basketball player, those statistics may instead comprise a player's field goal percentage, three-point percentage or average points, rebounds, assists, blocks or steals per game. In football, player statistics may include a quarterback's passing or running yards, points scored, etc. Ticker elements may additionally comprise news events such as the announcement of a player trade, delay in gameplay due to weather, such as rain, or a player injury. For example, a ticker element may comprise the New York Giant's running back, Mike Webber, is out with a hip injury. Similarly, news events may provide updates on a previous news event such as the date a player is expected to return from their current injury. Ticker elements may additionally include details about a wager, such as notifying the user that a new wager is available to be placed or providing the results of a user's current wager. Similarly, a ticker element may inform the user of the status of a parlay or an opportunity to place a parlay. A ticker element may also inform a user of changes to an available wager, such as improved odds for a team or player the user typically places wagers on. The ticker database 130 may additionally store a ticker priority score calculated by the ticker prioritization module 128 which may indicate the relevance of a ticker element to a user's preferences based on their wager history and the currently available wagers. The ticker database 130 may be populated by the administrator of a wagering network 114 or a third party, such as a sports news or statistics database or service. The ticker database 130 may be used by the base wagering module 124 and the ticker prioritization module 128.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for customizing and displaying a rolling ticker feed on a sport wagering network, comprising:
   automatically retrieving at least one wager preference associated with a user from a user database;
   retrieving at least one available wager from an odds database;
   displaying at least one available wager on a wagering application;
   retrieving two or more active ticker elements from a ticker database;
   determining at least one wager score for the two or more active ticker elements;
   determining at least one relevance score for each active ticker element based on the at least one wager preference from the user database, wherein the relevance score represents how closely the ticker element aligns with the at least one wager preference associated with the user;
   determining at least one ticker priority score for each active ticker element using at least one wager score and one relevance score, wherein the ticker priority score indicates the relevance of the two or more active ticker elements to the user in the context of the at least one available wager;
   utilizing the at least one ticker priority score for each active ticker element to determine an order of display for the two or more active ticker elements on the wagering application;
   determining input selection of at least one ticker element on the wagering application;
   receiving at least one input selection from the wagering application; and
   offering at least one available wager on the wagering application.

2. The method for customizing and displaying a rolling ticker feed on a sport wagering network of claim 1, wherein the wager preference further comprises at least a wager type and a wager characteristic.

3. The method for customizing and displaying a rolling ticker feed on a sport wagering network of claim 1, wherein the active ticker element further comprises at least one of a news event, a statistic, a live event status update, a sporting event, a player update, a team update, a weather update, and a score update.

4. The method for customizing and displaying a rolling ticker feed on a sport wagering network of claim 1, wherein the wager score is further determined by comparing at least one wager characteristic and at least one ticker element for a match.

5. The method for customizing and displaying a rolling ticker feed on a sport wagering network of claim 1, wherein the relevance score is further determined by comparing at least one wager preference and at least one ticker element for a match.

6. The method for customizing and displaying a rolling ticker feed on a sport wagering network of claim 1, wherein receiving input selection from the wagering application further comprises utilizing at least one of touch input, tap input, press input, tactile input, and voice input.

7. The method for customizing and displaying a rolling ticker feed on a sport wagering network of claim 1, wherein displaying at least one ticker element further comprises at least one of a banner, a band, a notification, a pop-up, and a text message.

8. The method for customizing and displaying a rolling ticker feed on a sport wagering network of claim 1, wherein the relevance score is determined by comparing each of a plurality of ticker characteristics to the at least one wager preference.

9. The method for customizing and displaying a rolling ticker feed on a sport wagering network of claim 1, wherein the ticker priority score is calculated by artificial intelligence.

10. A system for customizing and displaying a rolling ticker feed on a sport wagering network, comprising:
- a base wagering module;
- a preferences module;
- a ticker prioritization module; and
- a ticker database; wherein
  - the base wagering module is configured to initiate the preference module, receive at least one wager preference associated with a user and at least one available wager, display at least one wager, initiate the ticker prioritization module, retrieve two or more active ticker elements from the ticker database, determines an order of display for the two or more active ticker elements, display the two or more active ticker elements, determine selection of the active ticker element, and display at least one related wager to the active ticker element, determine placement of a wager;
  - the preferences module is configured to receive at least a user ID, automatically query a user database, identify at least one wager preference, save the wager preference to the user database, and send the wager preference to the base wagering module;
  - the ticker prioritization module is configured to receive at least one available wager, query the ticker database, select two or more ticker elements, determine at least one wager score, one relevance score, and one ticker priority score for each ticker element, save the ticker priority score to the ticker database for each ticker element, determine if there is at least one additional active ticker element, and send two or more updated ticker elements to the base wagering module; and
  - the ticker database is configured to contain two or more ticker elements and at least one ticker priority score for each ticker element;
- wherein, the relevance score represents how closely the ticker element aligns with the at least one wager preference associated with the user;
- the ticker priority score indicates the relevance of the active ticker element to the user in the context of the at least one available wager; and
- wherein the order of display for the two or more active ticker elements is determined by utilizing at least the ticker priority score for each active ticker element.

11. The system for customizing and displaying a rolling ticker feed on a sport wagering network of claim 10, wherein the ticker element is configured to be at least one of a news event, a statistic, a live event status update, a sporting event, a player update, a team update, a weather update, and a score update.

12. The system for customizing and displaying a rolling ticker feed on a sport wagering network of claim 10, wherein the ticker database is configured by at least one of an administrator, a sport news service, a statistic database, and a statistic service.

13. The system for customizing and displaying a rolling ticker feed on a sport wagering network of claim 10, wherein the base wagering module is configured to receive at least one of touch input, tap input, press input, tactile input, and voice input.

14. The system for customizing and displaying a rolling ticker feed on a sport wagering network of claim 10, wherein the relevance score is determined by comparing each of a plurality of ticker characteristics to the at least one wager preference.

15. The system for customizing and displaying a rolling ticker feed on a sport wagering network of claim 10, wherein the ticker priority score is calculated by artificial intelligence.

* * * * *